G. W. STARRETT.
Corn-Planters.
No. 142,656. Patented September 9, 1873.
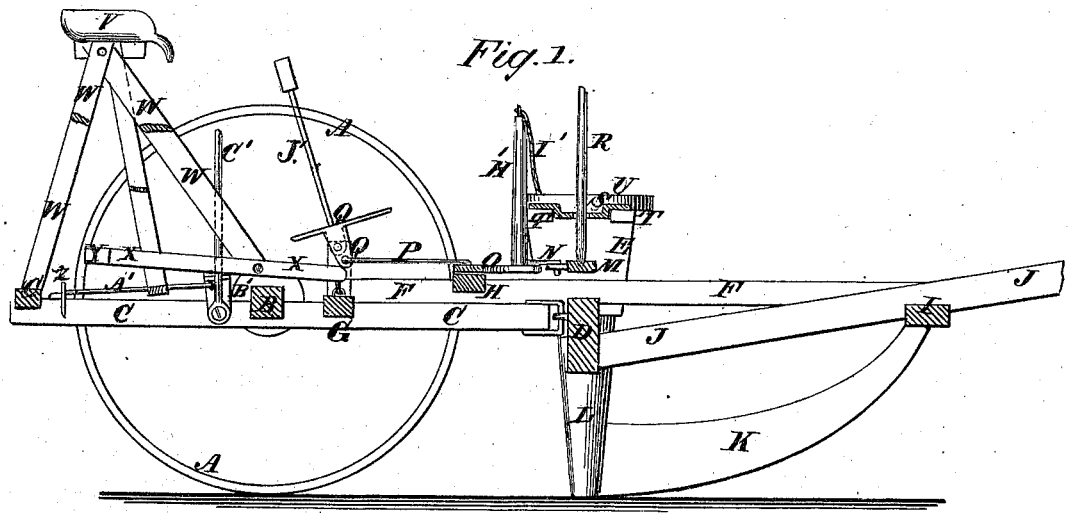
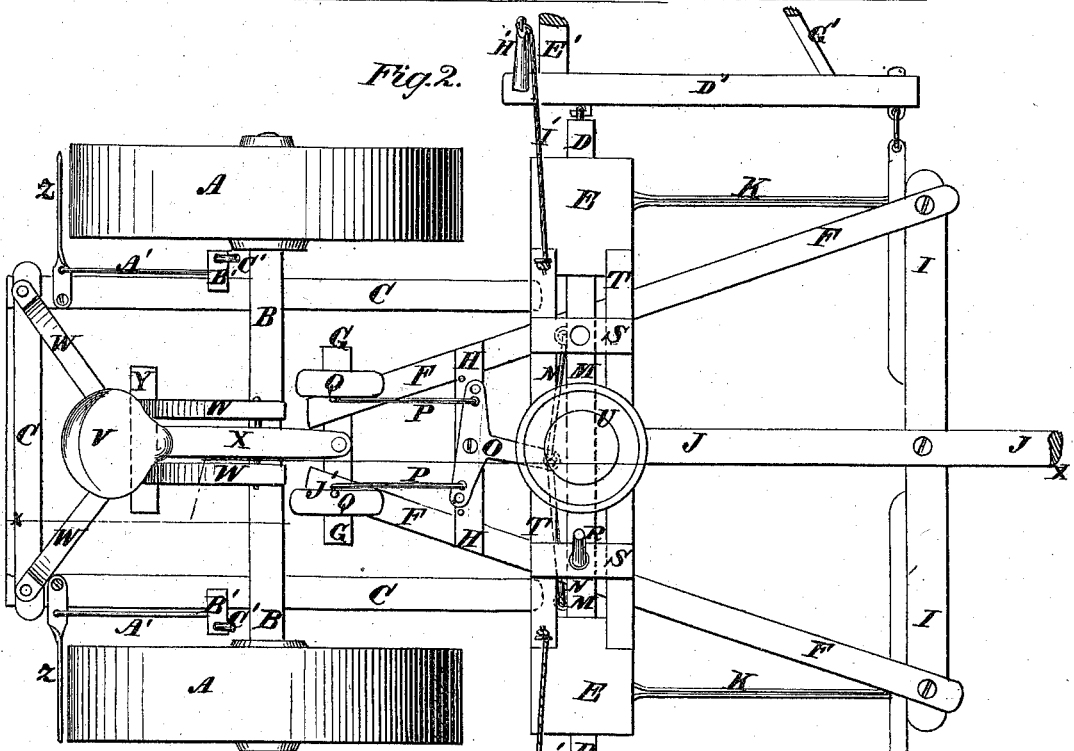

UNITED STATES PATENT OFFICE.

GEORGE W. STARRETT, OF DUBLIN, OHIO.

IMPROVEMENT IN CORN-PLANTERS.

Specification forming part of Letters Patent No. 142,656, dated September 9, 1873; application filed February 15, 1873.

*To all whom it may concern:*

Be it known that I, GEORGE W. STARRETT, of Dublin, in the county of Franklin and State of Ohio, have invented a new and useful Improvement in Corn-Planter, of which the following is a specification:

Figure 1 is a detail vertical longitudinal section of my improved planter taken through the line $x$ $x$, Fig. 2. Fig. 2 is a top view of the machine.

Similar letters of reference indicate corresponding parts.

The invention consists in the improvement of corn-planters, as hereinafter described and pointed out in the claim.

A are the drive-wheels, which are made broad to cover the seed, and which revolve upon the journals of the axle B, to which axle is attached the frame C. The side bars of the frame C project forward, and their forward ends are connected by clevises and staples, or other convenient means, with the bar or beam D, to the end of which the seed-hoppers E are attached. To the bar D, between the seed-hoppers E, are secured two bars, F, the rear ends of which nearly meet a little in front of the driver's seat, and are connected by cross-bars G H. The forward end of the bars F project in front of the bar D, and are connected by a cross-bar, I. To the middle part of the bar D and cross-bar I is secured the tongue J. To the ends of the cross-bar I are secured the forward ends of the openers K, which are made something like a sleigh-runner, and the rear ends of which are widened and made open to receive the lower ends of the conductor-spouts L, so that the seed may be deposited in the bottom of the furrow before it becomes partially filled by the falling in of the soil. The upper ends of the conductor-spouts L are secured to the bar D in such positions as to receive the seed from the dropping-slide M, which slides longitudinally upon the bar D, so as to take the seed from the hoppers E and deposit it in the spouts L. To the slide M are pivoted the outer ends of two rods, N, the inner ends of which are pivoted to the end of the forward arm of the double right-angled or three-armed lever O. By adjusting the ends of the said rods N nearer to or farther from the pivoting-point of the lever O, the movement or throw of the dropping-slide M may be regulated at will. The three-armed lever O is pivoted at its center to the center of the cross-bar H attached to the inclined bars F. To the side arms of the three-armed lever O are pivoted the ends of the connecting-rods P, several holes being formed in the said arms to receive the rods P, so that, by adjusting the ends of the said rods nearer to or farther from the center of the lever O, the throw of said lever may be regulated at will. Near the ends of the side arms of the three-armed lever O holes are formed in the cross-bar H to receive the ends of the rods P, so as to disconnect the treadles Q and the dropping-slide M when the latter is operated by the hand-lever R. The rear ends of the rods P are pivoted to the lower ends of the treadles Q, which are pivoted near the centers of the foot-rests of said treadles to short studs attached to the rear cross-bar G of the bars F, so that by working his feet the driver can operate the dropping-bar M to drop the seed. To one of the treadles Q is attached a rod or lever, J', which projects upward into such a position that it can be conveniently reached and operated by the driver with his hand, if desired. The lever J' has a ball or other weight attached to its upper end to adapt it to serve also as a balance to the treadles. The bar M can also be operated to drop the seed by means of a hand-lever, R, the lower end of which enters a hole in or is otherwise connected with the said bar M. The lever R passes through a hole in the bar or plate S, which forms its fulcrum. The ends of the bar or plate S are attached to the bars T, the ends of which are secured to the seed-hoppers E, and to the middle part of which is attached, the seat U, for the person that operates the lever R.

Having thus described my invention, I claim as new and desire to secure by Letters Patent—

The combination, with a pair of treadles, Q, of hand-lever J', three-armed lever O, rods N P, and dropping-slide M, as and for the purpose described.

GEORGE W. STARRETT.

Witnesses:
JOHN A. ISENBARG,
HENRY C. ISENBARG.